United States Patent
Tadakuma et al.

(10) Patent No.: US 7,630,607 B2
(45) Date of Patent: Dec. 8, 2009

(54) OPTICAL FIBER DEVICE

(75) Inventors: Masateru Tadakuma, Tokyo (JP); Masanori Takahashi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/168,374

(22) Filed: Jul. 7, 2008

(65) Prior Publication Data
US 2009/0028509 A1    Jan. 29, 2009

(30) Foreign Application Priority Data
Jul. 27, 2007    (JP)    ............... 2007-196642

(51) Int. Cl.
*G02B 6/00* (2006.01)
*G02B 6/02* (2006.01)

(52) U.S. Cl. ............ 385/122; 385/123; 359/341.3; 398/148; 398/159

(58) Field of Classification Search ............ 385/122, 385/123, 126; 359/334, 341.1, 341.3; 398/81, 398/148, 159
See application file for complete search history.

(56) References Cited

U.S. PATENT DOCUMENTS

| | | | | |
|---|---|---|---|---|
| 6,157,754 | A * | 12/2000 | Sasaoka et al. | 385/24 |
| 6,400,877 | B1 * | 6/2002 | Kato et al. | 385/123 |
| 6,404,964 | B1 * | 6/2002 | Bhagavatula et al. | 385/123 |
| 6,473,550 | B1 * | 10/2002 | Onishi et al. | 385/123 |
| 6,526,208 | B1 * | 2/2003 | King et al. | 385/123 |
| 6,701,051 | B2 * | 3/2004 | Mukasa | 385/123 |
| 6,934,454 | B2 * | 8/2005 | Terahara et al. | 385/122 |

OTHER PUBLICATIONS

U.S. Appl. No. 12/168,374, filed Jul. 7, 2008, Tadakuma, et al.
U.S. Appl. No. 12/197,596, filed Aug. 25, 2008, Takakuma.
Hidehiko Takara et al.,"Multi-Carrier Generation from a Single Supercontinuum Source", The Review of Laser Engineering, vol. 30, No. 1, Jan. 2002, pp. 33-37.
K. Mori et al., "Flatly broadened supercontinuum spectrum generated in a dispersion decreasing fibre with convex dispersion profile", Electronics Letters, vol. 33, No. 21, Oct. 9, 1997, pp. 1806-1808.
Yuichi Takushima et al., "Generation of over 140-nm-wide Super-Continuum from a Normal Dispersion Fiber by using a Mode-Locked Semiconductor Laser Source", IEEE Photonics Technology Letters, vol. 10, No. 11, Nov. 1998, pp. 1560-1562.

* cited by examiner

*Primary Examiner*—Daniel Petkovsek
(74) *Attorney, Agent, or Firm*—Oblon, Spivak, McClelland, Maier & Neustadt, L.L.P.

(57) ABSTRACT

An optical fiber device converts an input optical pulse having a predetermined center wavelength into an optical pulse having a wavelength bandwidth broader than that of the input optical pulse. The optical fiber device includes a plurality of optical fibers connected in a cascaded manner each having negative wavelength dispersion at the center wavelength. The optical fibers have different relative refractive index differences between a core region and a cladding region from each other. The optical fibers are connected such that wavelength dispersions of adjacent optical fibers at the center wavelength are different from each other.

6 Claims, 15 Drawing Sheets

FIG.5
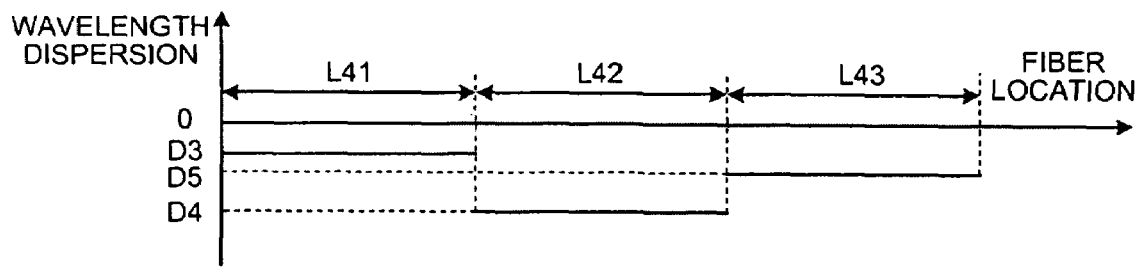
FIG.6
| FIBER | RELATIVE REFRACTIVE INDEX DIFFERENCE Δ [%] | NONLINEAR CONSTANT $\gamma$ [$W^{-1}km^{-1}$] | TRANSMISSION LOSS [dB/km] |
|---|---|---|---|
| 1 | 2.9 | 13 | 0.97 |
| 2 | 2.4 | 10 | 0.65 |
| 3 | 2.0 | 7.1 | 0.38 |
FIG.7
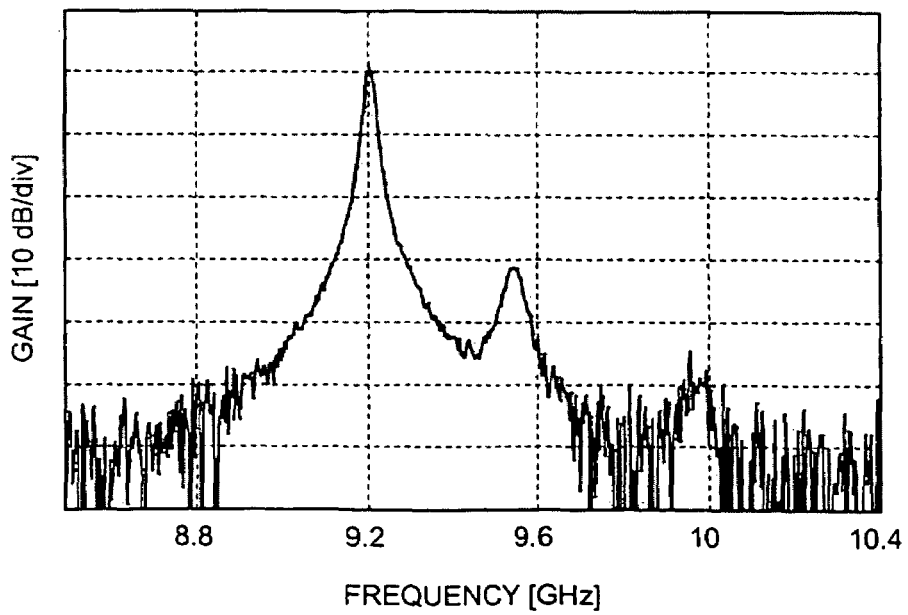

| | BRILLOUIN PEAK FREQUENCY [GHz] | SBS THRESHOLD [dBm] | | |
|---|---|---|---|---|
| | | 200 m (CALCULATED VALUE) | 400 m (CALCULATED VALUE) | 600 m (MEASURED VALUE) |
| FIRST COMPARATIVE EXAMPLE | 9.21 | 16.69 | 13.78 | 12.11 |
| SECOND COMPARATIVE EXAMPLE | 9.57 | 19.70 | 16.76 | 15.06 |
| THIRD COMPARATIVE EXAMPLE | 9.78 | 18.57 | 15.59 | 13.87 |
| AVERAGE | - | 18.32 | 15.38 | 13.68 |

| FIRST EXAMPLE | | SECOND EXAMPLE | |
|---|---|---|---|
| BRILLOUIN PEAK FREQUENCY [GHz] | SBS THRESHOLD [dBm] | BRILLOUIN PEAK FREQUENCY [GHz] | SBS THRESHOLD [dBm] |
| 9.20, 9.59 | 17.53 | 9.20, 9.59, 9.78 | 17.68 |

FIG.14

|  | WAVELENGTH DISPERSION [ps/nm/km] | DISPERSION SLOPE [ps/nm²/km] |
| --- | --- | --- |
| THIRD EXAMPLE | -1.2→-2.0 (AT EACH STAGE) | 0.022→0.022 (AT EACH STAGE) |
| FOURTH EXAMPLE | -1.1→-1.2→-1.1 (AT EACH STAGE) | 0.022→0.022→0.022 (AT EACH STAGE) |
| FOURTH COMPARATIVE EXAMPLE | -1.2 | 0.022 |
| FIFTH COMPARATIVE EXAMPLE | -0.9 | 0.022 |
| SIXTH COMPARATIVE EXAMPLE | -0.8 | 0.022 |

FIG.15

|  | AVERAGE INTENSITY [dBm] | | |
| --- | --- | --- | --- |
|  | 200 m | 400 m | 600 m |
| THIRD EXAMPLE | - | 29.9 | - |
| FOURTH EXAMPLE | - | - | 29.9 |
| FOURTH COMPARATIVE EXAMPLE | 29.9 | - | - |
| FIFTH COMPARATIVE EXAMPLE | - | 27.0 | - |
| SIXTH COMPARATIVE EXAMPLE | - | - | 25.3 |

|  | 10-dB BANDWIDTH [nm] | 3-dB BANDWIDTH [nm] |
|---|---|---|
| THIRD EXAMPLE | 78.9 | 33.1 |
| FOURTH EXAMPLE | 81.5 | 34.4 |
| FOURTH COMPARATIVE EXAMPLE | 73.9 | 34.5 |
| FIFTH COMPARATIVE EXAMPLE | 62.7 | 26.4 |
| SIXTH COMPARATIVE EXAMPLE | 55.0 | 22.1 |

FIG.28

| STAGE | RELATIVE REFRACTIVE INDEX DIFFERENCE Δ [%] | NONLINEAR CONSTANT γ [$W^{-1}km^{-1}$] | DISPERSION SLOPE [$ps/nm^2/km$] | WAVELENGTH DISPERSION [ps/nm/km] | TRANSMISSION LOSS [dB/km] | STAGE LENGTH [m] | ZERO-DISPERSION WAVELENGTH $\lambda_0$ [nm] |
|---|---|---|---|---|---|---|---|
| 1 | 2.9 | 13.0 | 0.022 | -1.0 | 0.97 | 150 | 1595.5 |
| 2 | 2.6 | 11.2 | 0.022 | -1.2 | 0.78 | 150 | 1604.5 |
| 3 | 2.4 | 10.0 | 0.022 | -1.4 | 0.65 | 150 | 1613.6 |
| 4 | 2.0 | 7.1 | 0.022 | -1.6 | 0.38 | 150 | 1622.7 |

OPTICAL FIBER DEVICE

BACKGROUND OF THE INVENTION

1. Field of the Invention

The present invention relates to an optical fiber device that receives an input optical pulse having a predetermined center wavelength and outputs an optical pulse having a wavelength bandwidth broader than that of the input optical pulse.

2. Description of the Related Art

As transmission capacity and signal speed increase in optical communication, an all-optical processing technology gets an attention as a key technology for the future, in which an optical signal is transmitted as it is without being converted into an electric signal by a transceiver or a repeater. As a device for performing the all-optical processing technology, an optical fiber device using a nonlinear effect in an optical fiber and a device using semiconductor are being studied.

A supercontinuum (SC) light source generates a SC light, i.e., an optical pulse with a broadband spectrum of tens to hundreds nanometers. It is also expected to be used as a light source for broadband optical communication and a light source for sensing, for example, an optical coherent tomography (see, for example, Hidehiko Takara, et al., "Multi-Carrier Generation from a Single Supercontinuum Source", Laser Engineering, Vol. 30, No. 1, p. 33, January 2002).

The SC light source includes an optical pulse source, an optical amplifier, and an optical fiber. The optical pulse source generates an optical pulse, which is amplified by the optical amplifier and enters into an input facet of the optical fiber. The optical pulse causes the nonlinear effect in the optical fiber, which broadens a spectral bandwidth of the optical pulse, resulting in an emission of the SC light from an output facet of the optical fiber. A plurality of nonlinear effects is considered to be caused in the optical fiber including self-phase modulation, cross-phase modulation, four-wave mixing, and Raman scattering.

Optical properties of the SC light source are greatly affected by a wavelength dispersion of the optical fiber. There are two types of the SC light source depending on conditions for determining the wavelength dispersion of the optical fiber. One type uses a dispersion-decreasing optical fiber in which an optical pulse input to the input facet of the optical fiber changes continuously from anomalous dispersion to normal dispersion toward the output facet, as disclosed in K. Mori, et al., "Flatly Broadened Supercontinuum Spectrum Generated in a Dispersion Decreasing Fiber with Convex Dispersion Profile", Electron. Lett., Vol. 33, No. 21, pp. 1806-1808, 1997. The other type uses an optical fiber that has uniform normal dispersion through its whole length, as disclosed in Y. Takushima, et al., "Generation of over 140-nm wide Super-Continuum from a Normal Dispersion Fiber by Using a Mode-Locked Semiconductor Laser Source", IEEE Photon. Technol. Lett., Vol. 10, No. 11, pp. 1560-1562, 1998. The optical fiber with the normal dispersion is advantageous because of its high spectral flatness and high signal-to-noise ratio (SNR). Furthermore, the spectrum of the SC light generated in the normal dispersion fiber broadens from the center wavelength of the input optical pulse to longer and shorter wavelength areas. As the absolute value of the wavelength dispersion becomes small, the spectrum broadens more.

However, a general optical fiber has a positive wavelength dispersion slope, i.e., the wavelength dispersion increases as the wavelength increases. As a result, in an area of wavelength longer than a zero-dispersion wavelength, an anomalous dispersion is observed, i.e., the wavelength dispersion is positive. In the anomalous dispersion area, modulation instability (MI) occurs to the spectrum. Therefore, if the spectrum of the light broadens into the anomalous dispersion area, noises and ripples increase and the spectral flatness degrades. On the other hand, even when the spectrum broadens in the normal dispersion area, if the absolute value of the wavelength dispersion is too small, the spectral flatness degrades.

There is a method of increasing the bandwidth of the light in an optical fiber by using a long optical fiber and an intense optical pulse, whereby increasing the nonlinear effect. However, when the stage length of the optical fiber and the intensity of the optical pulse are increased, the stimulated Brillouin scattering (SBS) occurs notably. The SBS is a phenomenon in which a part of input light is scattered backward as a Brillouin-shifted light without being transmitted through the optical fiber. The SBS occurs when an intense light having intensity higher than a predetermined threshold is input to the optical fiber. Due to the SBS, even if the intense light is input, the nonlinear effect is not increased as desired in the optical fiber. Therefore, the intensity of the optical pulse input to the optical fiber is limited and the bandwidth of the SC light can hardly be broadened.

SUMMARY OF THE INVENTION

It is an object of the present invention to at least partially solve the problems in the conventional technology.

According to an aspect of the present invention, there is provided an optical fiber device that receives a first optical pulse having a predetermined center wavelength and outputs a second optical pulse having a wavelength bandwidth broader than that of the first optical pulse. The optical fiber device includes a plurality of optical fibers connected in a cascaded manner each having negative wavelength dispersion at the center wavelength. The optical fibers have different relative refractive index differences between a core region and a cladding region from each other. The optical fibers are connected such that wavelength dispersions of adjacent optical fibers at the center wavelength are different from each other.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic diagram for explaining relation between a fiber location in the longitudinal direction in the optical fiber device shown in FIG. 4 and the wavelength dispersion at 1550 nm;

FIG. 6 is a table of optical properties of optical fibers according to examples and comparative examples of the present invention;

FIG. 7 is a graph of the spectrum of the Brillouin scattered light generated when a continuous light at 1550 nm is input to an optical fiber device in a first comparative example of the present invention;

FIG. 14 is a table showing wavelength dispersion properties of the optical fiber devices according to a third example, a fourth example, a fourth comparative example, a fifth comparative example, and a sixth comparative example of the present invention at 1550 nm;

FIG. 15 is a table showing average intensities of input optical pulses for calculating properties of the SC lights according to the examples and comparative examples;

FIG. 28 is a table showing properties of optical fibers used in an optical fiber device according to a fifth example of the present invention;

DETAILED DESCRIPTION OF THE PREFERRED EMBODIMENTS

Exemplary embodiments of the present invention are described in detail below with reference to the accompanying drawings. Terms and measuring methods described herein comply with International Telecommunication Union Telecommunication Standardization Sector (ITU-T) G.650.1, unless otherwise specified.

Figure 1:
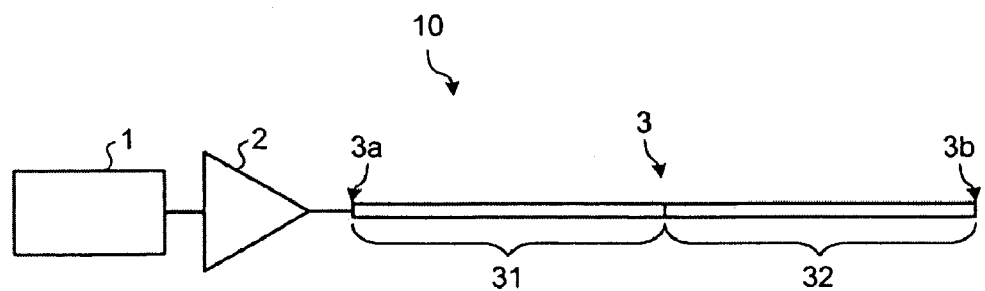
FIG. 1 is a schematic diagram of a supercontinuum (SC) light source that includes an optical fiber device according to a first embodiment of the present invention.

FIG. 1 is a schematic diagram of a supercontinuum (SC) light source 10 that includes an optical fiber device according to a first embodiment of the present invention. The SC light source 10 includes an optical pulse source 1, an optical amplifier 2 connected to the optical pulse source 1, and an optical fiber device 3 connected to the optical amplifier 2. The optical pulse source 1 emits an optical pulse at a predetermined center wavelength. The optical amplifier 2 amplifies the optical pulse received from the optical pulse source 1. The optical fiber device 3 receives the optical pulse amplified by the optical amplifier 2 and emits an optical pulse with a broadened wavelength bandwidth, i.e., a SC light.

The optical pulse source 1 is, for example, an optical fiber laser, which emits an optical pulse at a center wavelength of 1550 nm, a pulse width of 2.0 ps, and a repetition frequency of 10 GHz. The optical amplifier 2 is, for example, a double-cladding erbium-ytterbium-doped fiber amplifier (EYDFA), which amplifies the optical pulse received from the optical pulse source 1 to about 30 dBm at maximum.

The optical fiber device 3 includes a first-stage optical fiber 31 and a second-stage optical fiber 32 connected to each other in a cascaded manner. An input facet 3a at an end of the first-stage optical fiber 31 receives the optical pulse amplified by the optical amplifier 2, and an output facet 3b at an end of the second-stage optical fiber 32 emits the SC light.

Figure 2:
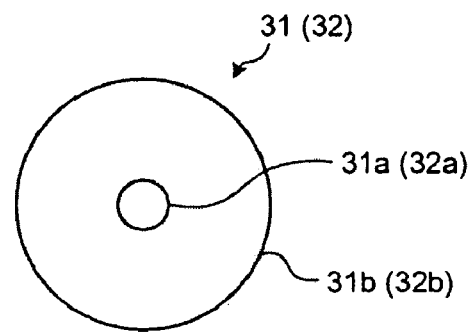
FIG. 2 is a cross section of each optical fiber included in the optical fiber device shown in FIG. 1.

FIG. 2 is a cross sectional of each optical fiber included in the optical fiber device 3. The first-stage optical fiber 31 includes a core region 31a and a cladding region 31b formed around the core region 31a. A refractive index of the cladding region 31b is lower than that of the core region 31a. The second-stage optical fiber 32 includes a core region 32a and a cladding region 32b formed around the core region 32a, and the refractive index of the cladding region 32b is lower than that of the core region 32a. The first-stage optical fiber 31 and the second-stage optical fiber 32 include a coating (not shown) with, for example, ultraviolet-curable resin around the cladding region 31b and the cladding region 32b, respectively.

A relative refractive index difference of the first-stage optical fiber 31 is different that of the second-stage optical fiber 32. The relative refractive index difference is a difference between the refractive index of the core region and the refractive index of the cladding region. Therefore, a Brillouin shift frequency in the first-stage optical fiber 31 is different from that in the second-stage optical fiber 32. Because the optical fiber device 3 has a higher SBS threshold compared with an optical fiber of the same length and having a uniform relative refractive index difference through the whole length, the optical fiber device 3 receives an optical pulse with higher intensity without generating the SBS and emits a SC light with a broader spectral bandwidth. Furthermore, when the relative refractive index difference of each optical fiber is 2% or more, the nonlinear effect is higher and the optical fiber device 3 emits the SC light with even broader spectral bandwidth.

The relative refractive index difference is calculated by $$\Delta = \{(n_1 - n_c)/n_c\} \times 100 \tag{1}$$

where $n_1$ is maximum refractive index of each of the core regions 31a and 32a and $n_c$ is refractive index of each of the cladding regions 31b and 32b.

Figure 3:
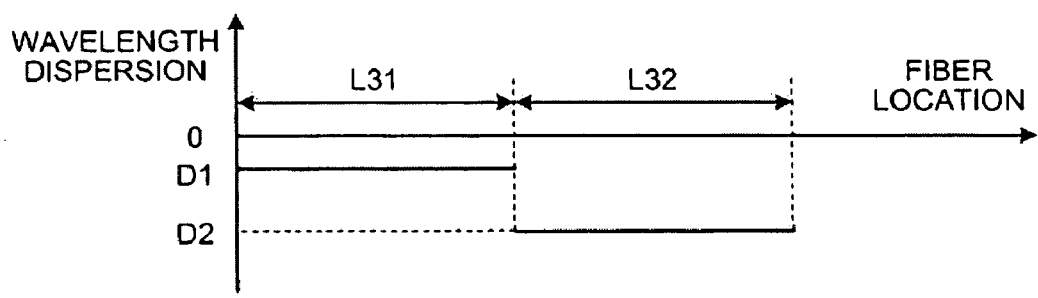
FIG. 3 is a schematic diagram for explaining a relation between a fiber location in the longitudinal direction in the optical fiber device and the wavelength dispersion at 1550 nm.

Wavelength dispersions of the first-stage optical fiber 31 and the second-stage optical fiber 32 are negative at 1550 nm, which means normal dispersion, and are different from each other. FIG. 3 is a schematic diagram for explaining a relation between a fiber location in the longitudinal direction in the optical fiber device 3 and the wavelength dispersion at 1550 nm. A section indicated by L31 corresponds to the first-stage optical fiber 31, and a section indicated by L32 corresponds to the second-stage optical fiber 32. The wavelength dispersion of the first-stage optical fiber 31 is a negative value of D1 [ps/nm/km], which is virtually uniform through the whole stage length. The wavelength dispersion of the second-stage optical fiber 32 is a negative value of D2 [ps/nm/km], which is smaller than D1 and virtually uniform through the whole stage length.

A spectrum of a SC light generated in a normal dispersion fiber broadens from the center wavelength of the input optical pulse to longer and shorter wavelength areas while propagating through the optical fiber. Therefore, the SC light in the second-stage optical fiber 32 is broader in the longer and shorter wavelength areas than that in the first-stage optical fiber 31. Because the wavelength dispersion of the second-stage optical fiber 32 is the negative value D2 smaller than D1, the absolute value of the wavelength dispersion in the longer wavelength area is large enough to suppress noises and ripples on the spectrum caused by, for example, the modulation instability (MI), even when the SC light broadens in the longer wavelength area. As a result, the second-stage optical fiber 32 emits a SC light with high spectral flatness.

As explained above, a SC light with a broadband spectrum and high spectral flatness is generated using the optical fiber device 3 according to the first embodiment.

While two stages of optical fibers are connected to each other according to the first embodiment, three or more stages of the optical fibers can be connected to one another so that the absolute value of the wavelength dispersion increases from the input facet to the output facet. By increasing the stages of the optical fibers to be connected, the wavelength dispersion can be more preferably distributed in the lengthwise direction of the optical fiber device according to the broadness of the spectrum of the SC light.

Preferably, an optical fiber with the highest relative refractive index difference is connected as the first-stage, and other optical fibers follow in the descending order of the relative refractive index difference. When the optical fibers are connected in the descending order of the relative refractive index difference from the input facet toward the output facet, the optical fiber that effectively causes the nonlinear effects is located in a position that receives an intense optical pulse on the input facet. As a result, the nonlinear effects occur effectively.

An optical fiber device 4 according to a second embodiment of the present invention is explained below. The optical fiber device 4 includes three stages of optical fibers. The optical fibers are connected so that the absolute value of the wavelength dispersion of the optical fibers increases from the input facet toward a predetermined point between the input facet and the output facet, and then decreases from the predetermined point toward the output facet.

Figure 4:
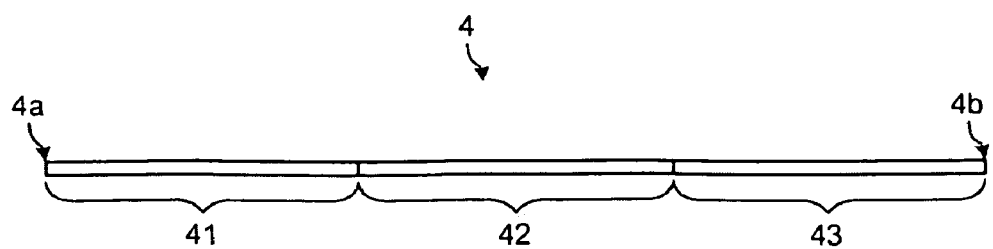
FIG. 4 is a side view of an optical fiber device according to a second embodiment of the present invention.

FIG. 4 is a side view of the optical fiber device 4. The optical fiber device 4 includes a first-stage optical fiber 41, a second-stage optical fiber 42, and a third-stage optical fiber 43 connected to one another in a cascaded manner. As in the first embodiment, an input facet 4a at an end of the first-stage optical fiber 41 receives an optical pulse amplified by an optical amplifier (not shown), and an output facet 4b at an end of the third-stage optical fiber 43 emits a SC light.

As in the first embodiment, each of the first-stage optical fiber 41, the second-stage optical fiber 42, and the third-stage optical fiber 43 includes a core region and a cladding region formed around the core region. The refractive index of the cladding region is lower than that of the core region in each optical fiber. The relative refractive index differences are different among the first-stage optical fiber 41, the second-stage optical fiber 42, and the third-stage optical fiber 43. Therefore, the Brillouin shift frequencies are different among the first-stage optical fiber 41, the second-stage optical fiber 42, and the third-stage optical fiber 43, which increase the SBS threshold. As a result, the optical fiber device 4 receives an optical pulse with higher intensity without generating the SBS and emits a SC light with a broader spectral bandwidth.

FIG. 5 is a schematic diagram for explaining relation between a fiber location in the longitudinal direction in the optical fiber device 4 and the wavelength dispersion at 1550 nm. A section indicated by L41 corresponds to the first-stage optical fiber 41, a section indicated by L42 corresponds to the second-stage optical fiber 42, and a section indicated by L43 corresponds to the third-stage optical fiber 43. The wavelength dispersion of the first-stage optical fiber 41 is a negative value of D3, which is virtually uniform through the whole stage length. The wavelength dispersion of the second-stage optical fiber 42 is a negative value of D4, which is smaller than D3 and virtually uniform through the whole stage length. The wavelength dispersion of the third-stage optical fiber 43 is a negative value of D5, which is larger than D4 and virtually uniform through the whole stage length.

As with the optical fiber device 3, because the wavelength dispersion of the second-stage optical fiber 42 is the negative value of D4 smaller than D3, the absolute value of the wavelength dispersion in the longer wavelength area is large enough to suppress noises and ripples on the spectrum even when the SC light broadens in the longer wavelength area. As a result, the second-stage optical fiber 42 emits a SC light with high spectral flatness. Furthermore, the absolute value of the wavelength dispersion decreases to the extent that the noises and ripples do not increase in the third-stage optical fiber 43, whereby increasing the nonlinear effects in the third-stage optical fiber 43. As a result, the optical fiber device 4 suppresses noises and ripples on the spectrum and emits a light with even broader spectral bandwidth.

Examples and comparative examples of an optical fiber device according to an aspect of the present invention are explained below in detail. The present invention is not limited to the examples and the comparative examples.

FIG. 6 is a table of optical properties of optical fibers used in the examples and the comparative examples. The values of the optical properties shown in FIG. 6 are values at the wavelength of 1550 nm. The symbol Δ indicates the relative refractive index difference. The nonlinear constant γ is calculated by $\gamma=2\pi n_2/(\lambda A_{\mathit{eff}})$, where λ is wavelength, $n_2$ is nonlinear refractive index of the core region, and $A_{\mathit{eff}}$ is effective area. Optical fibers 1, 2, and 3 shown in FIG. 6 are silica-based optical fibers having a core region formed with germanium-doped silica glass, a cladding region formed with pure silica glass. Optical properties of each fiber are virtually uniform through the whole length. The optical fibers 1, 2, and 3 are highly-nonlinear optical fibers, which have a nonlinear constant five times higher than that of a typical single-mode optical fiber, resulting in efficient nonlinear effects. The highly-nonlinear optical fiber can be produced by increasing the optical confinement of the core of a silica-based optical fiber by increasing doping amount of germanium into the core region and decreasing the effective area.

An optical fiber device according to a first example of the present invention includes the optical fiber 1 at the first stage and the optical fiber 2 at the second stage. Each stage length is 200 m, and therefore the total length of the optical fiber device according to the first example is 400 m. An optical fiber device according to a second example of the present invention includes the optical fiber 1 at the first stage, the optical fiber 2 at the second stage, and the optical fiber 3 at the third stage. Each stage length is 200 m, and therefore the total length of the optical fiber device according to the second example is 600 m.

An optical device according to a first comparative example of the present invention includes only the optical fiber 1. Optical devices according to a second comparative example and a third comparative example of the present invention include only the optical fibers 2 and 3, respectively. The whole length of each of the optical devices according to the first comparative example, the second comparative example, and the third comparative example is 600 m.

Figure 8:
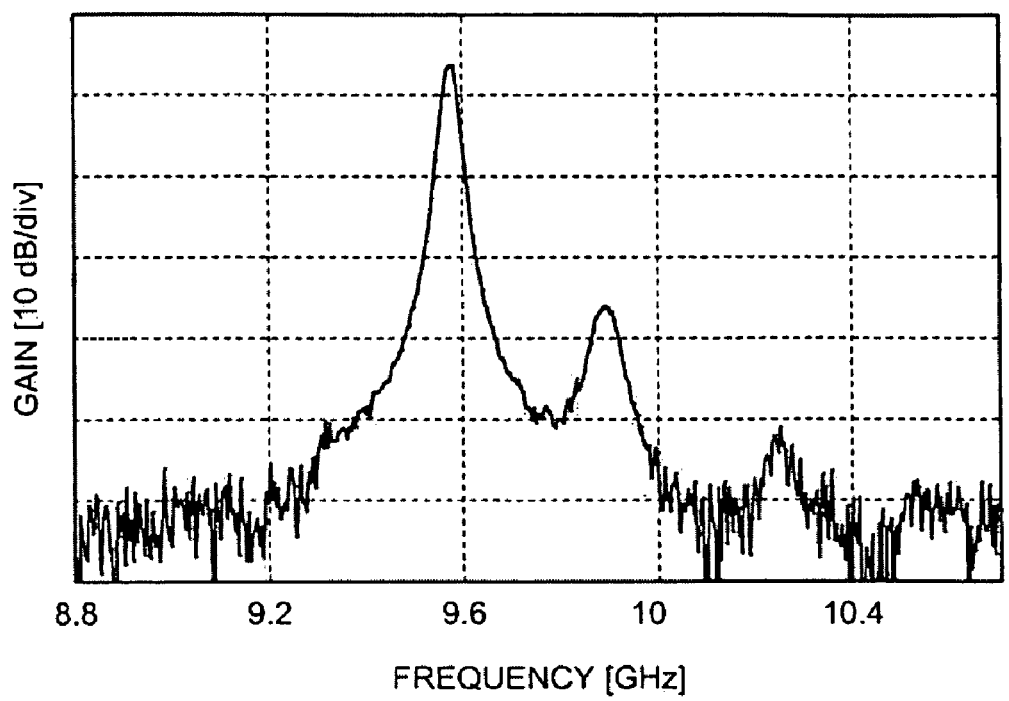
FIG. 8 is a graph of the spectrum of the Brillouin scattered light generated when a continuous light at 1550 nm is input to an optical fiber device in a second comparative example of the present invention.
Figure 9:
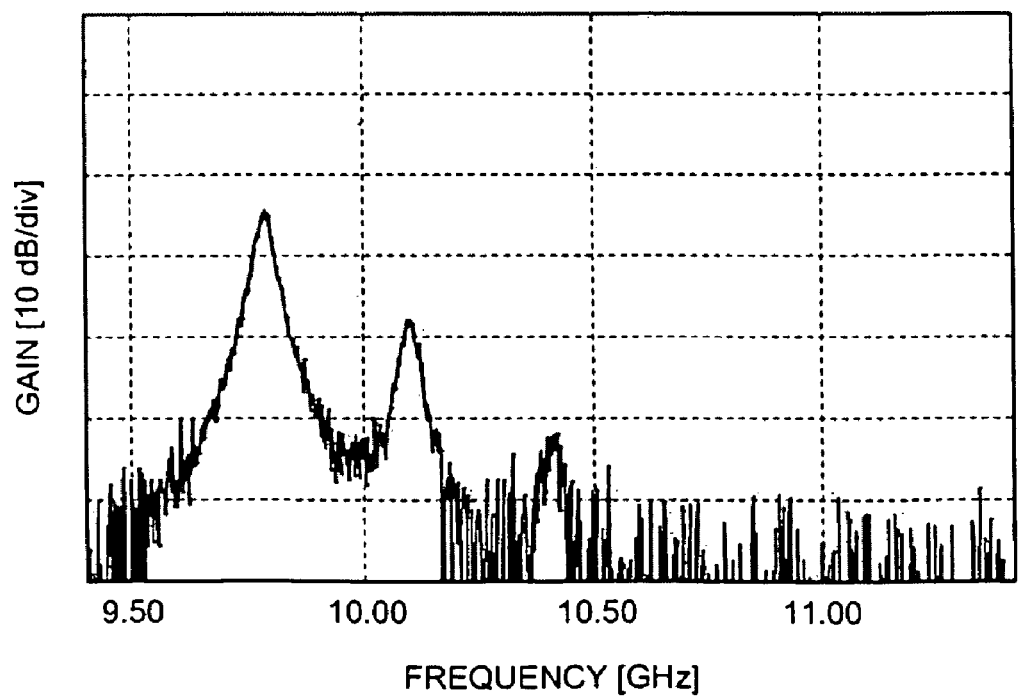
FIG. 9 is a graph of the spectrum of the Brillouin scattered light generated when a continuous light at 1550 nm is input to an optical fiber device in a third comparative example of the present invention.

SBS properties of the optical fiber devices according to the examples and the comparative examples when a continuous light is input are explained below. FIGS. 7, 8, and 9 are graphs of the spectra of Brillouin scattered lights generated when a continuous light at 1550 nm is input to the optical fiber devices in the first comparative example, the second comparative example, and the third comparative example, respectively. The horizontal axis indicates the Brillouin shift frequency and the vertical axis indicates a relative Brillouin gain. The optical fiber devices according to the first comparative example, the second comparative example, and the third comparative example have different relative refractive index differences, and therefore Brillouin peaks in Brillouin scattered light spectra are at different frequencies.

Figures 10, 11:
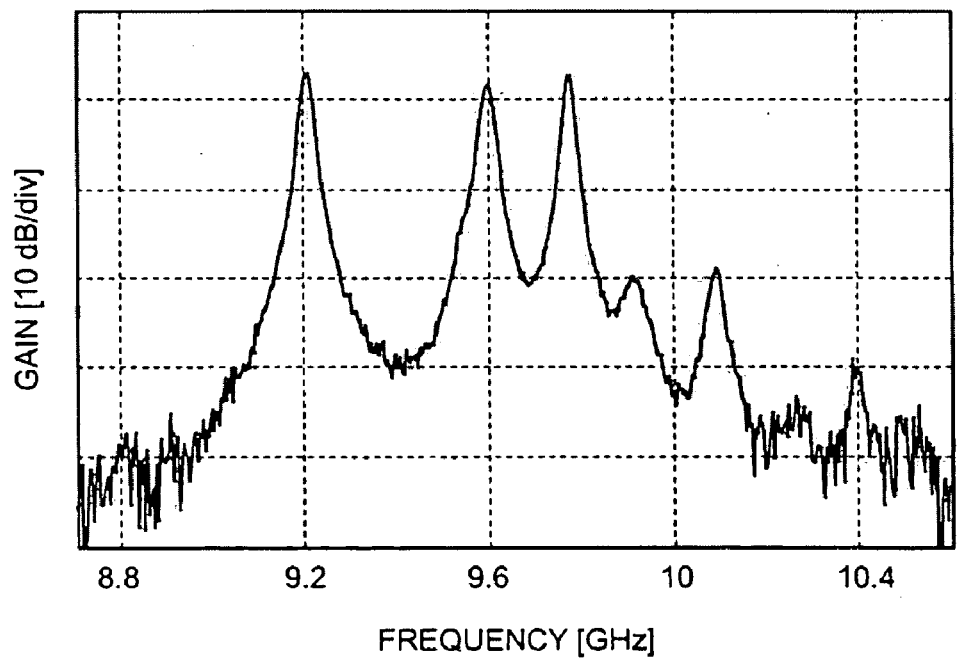
FIG. 10 is a table showing Brillouin peak frequencies and stimulated Brillouin scattering (SBS) thresholds of the optical fiber devices according to the first comparative example, the second comparative example, and the third comparative example.
FIG. 11 is a graph of the spectrum of Brillouin scattered light generated in an optical fiber device according to a second example of the present invention when the continuous light at 1550 nm is input to a facet of a third-stage optical fiber.

FIG. 10 is a table showing the Brillouin peak frequencies and the SBS thresholds of the optical fiber devices according to the first comparative example, the second comparative example, and the third comparative example. The SBS thresholds at 600 m are measured values, and those at 200 m and 400 m are calculated from the measured values by $$P_{th}=21(KA_{\mathit{eff}}/g_B L_{\mathit{eff}})(1+\Delta v/\Delta v_B) \quad (2)$$

$$L_{\mathit{eff}}=\{1-\exp(-\alpha L)\}/\alpha \quad (3)$$

$$\alpha=(\ln 10/10)a \quad (4)$$

where $A_{\mathit{eff}}$ is effective area, K is polarization-dependent parameter (K=1 when input light is parallel to scattered light, K=2 otherwise), L is whole length, $L_{\mathit{eff}}$ is effective length, $\Delta v_B$ is spectral bandwidth at the Brillouin peak, $\Delta v$ is spectral line width of the input light, $g_B$ is Brillouin gain at the peak, α is loss coefficient (/km), and a is extinction coefficient (dB/km).

Transmission losses shown in FIG. 6 are used as the raw loss factor a. Calculation of Equation (2) is performed assuming $(1+\Delta v/\Delta v_B)$ as one because the spectral line width of the input light $\Delta v$ is 200 kHz and the spectral bandwidth at the Brillouin peak is about 30 megahertz in FIGS. 7, 8, and 9.

Because the optical fiber devices according to the first comparative example, the second comparative example, and the third comparative example have different relative refractive index differences, Brillouin peaks thereof are at different frequencies and the thresholds thereof are different. Furthermore, the SBS threshold decreases as the length increases in any one of the optical fibers.

Figures 12, 13:
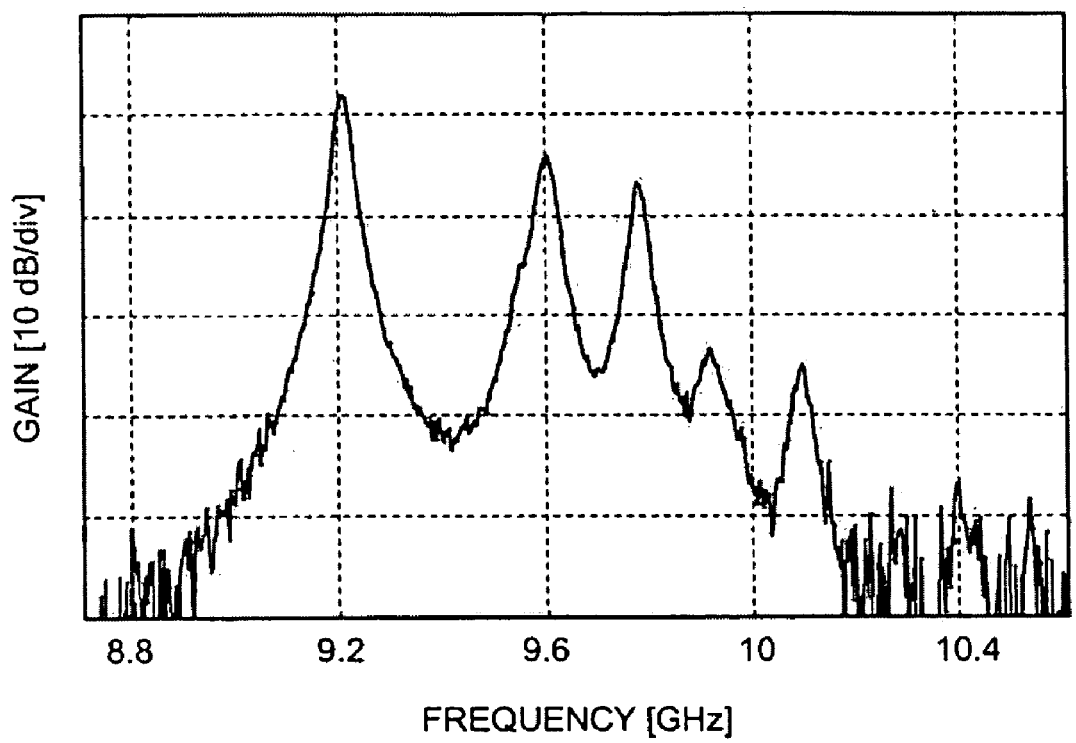
FIG. 12 is a graph of the spectrum of Brillouin scattered light generated in the optical fiber device according to the second example when the continuous light at 1550 nm is input to an end of a first-stage optical fiber.
FIG. 13 is a table showing Brillouin peak frequencies and an SBS threshold of the optical fiber devices according to a first example and the second example.

SBS properties of the optical fiber devices according to the examples are explained below. FIGS. 11 and 12 are graphs of the spectra of Brillouin scattered lights generated in the optical fiber device according to the second example when the continuous light in the same state as the comparative examples is input. Because the optical fiber device according to the second example includes three stages of optical fibers having different relative refractive index differences, there are three high Brillouin peaks in the Brillouin scattered light spectrum.

FIG. 13 is a table showing Brillouin peak frequencies and SBS thresholds of the optical fiber devices according to the first example and the second example.

As seen from comparison between FIGS. 10 and 13, the optical fiber device according to the first example has the Brillouin peak frequencies at 9.20 GHz and 9.59 GHz, which are approximately equal to the Brillouin peak frequencies of the optical fiber devices according to the first comparative example and the second comparative example. In other words, the Brillouin peak frequencies of the optical fiber device according to the first example are reproduction of the Brillouin peak frequencies of the optical fibers included therein. In the same manner as the first example, the Brillouin peak frequencies of the optical fiber device according to the second example are reproduction of the Brillouin peak frequencies of the optical fibers included therein.

The SBS threshold of the optical fiber device according to the first example with the total length of 400 m is 17.53 dBm. The SBS threshold is higher by one to four decibels than calculated values of the optical fiber devices according to the first comparative example and the second comparative example at 400 m, and close to the calculated values at 200 m. In other words, despite the total length, the SBS threshold of the optical fiber device according to the first example is comparable to that of each optical fiber at a shorter stage length. Generation of the SBS is effectively suppressed in the optical fiber device according to the first example compared with the optical fiber devices according to the first comparative example, the second comparative example, and the third comparative example that are of the same length and uniform through the whole length.

The SBS threshold of the optical fiber device according to the second example with the total length of 600 m is 17.68 dBm, which is higher than the calculated values of the optical fiber devices according to the first comparative example, the second comparative example, and the third comparative example at the whole length of 600 m by about three to six decibels, suppressing generation of the SBS more effectively.

SBS properties of the optical fiber devices according to the examples and comparative examples when optical pulses are input are explained below. The optical fiber 1 shown in FIG. 6 with the whole length of 4,880 m is used as a test optical fiber. When optical pulses having the center wavelength of 1550 nm, the pulse width of 2.0 ps, and the repetition frequency of 10 GHz are input to the test optical fiber, the measured SBS threshold is 18.1 dBm. The SBS thresholds at 200 m, 400 m, and 600 m are calculated from the measured value using Equation (2), which are 29.9 dBm, 27.0 dBm, and 25.3 dBm, respectively. Compared with the SBS thresholds when the continuous light is input as shown in FIG. 10, the SBS threshold with the optical pulses is higher than that with the continuous light by about 13.2 dB with the same whole length.

The properties of the SC lights generated from optical fiber devices according to the third example, the fourth example, a fourth comparative example, a fifth comparative example, and a sixth comparative example of the present invention when optical pulses are input thereto are explained below using the calculation results. FIG. 14 is a table showing wavelength dispersion properties of the optical fiber devices according to a third example, a fourth example, the fourth comparative example, the fifth comparative example, and the sixth comparative example at 1550 nm.

The optical fiber device according to the third example includes the same configuration as the optical fiber device according to the first example. As shown in FIG. 14, the wavelength dispersion of the first-stage optical fiber is −1.2 ps/nm/km, and that of the second-stage optical fiber is −2.0 ps/nm/km. A wavelength dispersion slope of the first-stage and second-stage optical fibers is 0.022 ps/nm$^2$/km each.

The optical fiber device according to the fourth example includes the same configuration as the optical fiber device according to the second example. The wavelength dispersion of the first-stage optical fiber is −1.1 ps/nm/km, that of the second-stage optical fiber is −1.2 ps/nm/km, and that of the third-stage optical fiber is −1.1 ps/nm/km. The wavelength dispersion slope of the first-stage, second-stage, and third-stage optical fibers is 0.022 ps/nm$^2$/km each.

Each of the optical fiber devices according to the fourth comparative example, the fifth comparative example, and the sixth comparative example includes the optical fiber 1. The wavelength dispersion is −1.2 ps/nm/km and the whole lengths is 200 m in the fourth comparative example. The wavelength dispersion is −0.9 ps/nm/km and the whole lengths is 400 m in the fifth comparative example. The wavelength dispersion is −0.8 ps/nm/km and the whole lengths is 600 m in the sixth comparative example. The dispersion slope of each of the fourth comparative example, the fifth comparative example, and the sixth comparative example is 0.022 ps/nm$^2$/km.

Calculated properties of the SC lights generated from the optical fiber devices according to the examples and the comparative examples when optical pulses are input thereto are explained below. The optical pulses used herein are Gaussian pulses at the center wavelength of 1550 nm, the pulse width of 2.0 ps, and the repetition frequency of 10 GHz. The average intensity of the optical pulses in each of the examples and comparative examples is equal to the SBS threshold thereof.

The SBS threshold is calculated from the SBS threshold when the continuous light is input as shown in FIGS. 10 and 13, and comparison of the SBS thresholds with the optical pulses and the continuous light as described above.

FIG. 15 is a table showing the average intensity of the input optical pulses for calculating properties of the lights according to the examples and comparative examples. For example, when the average intensity is 29.9 dBm, a peak power of the optical pulse is 43 watt.

Figure 16:
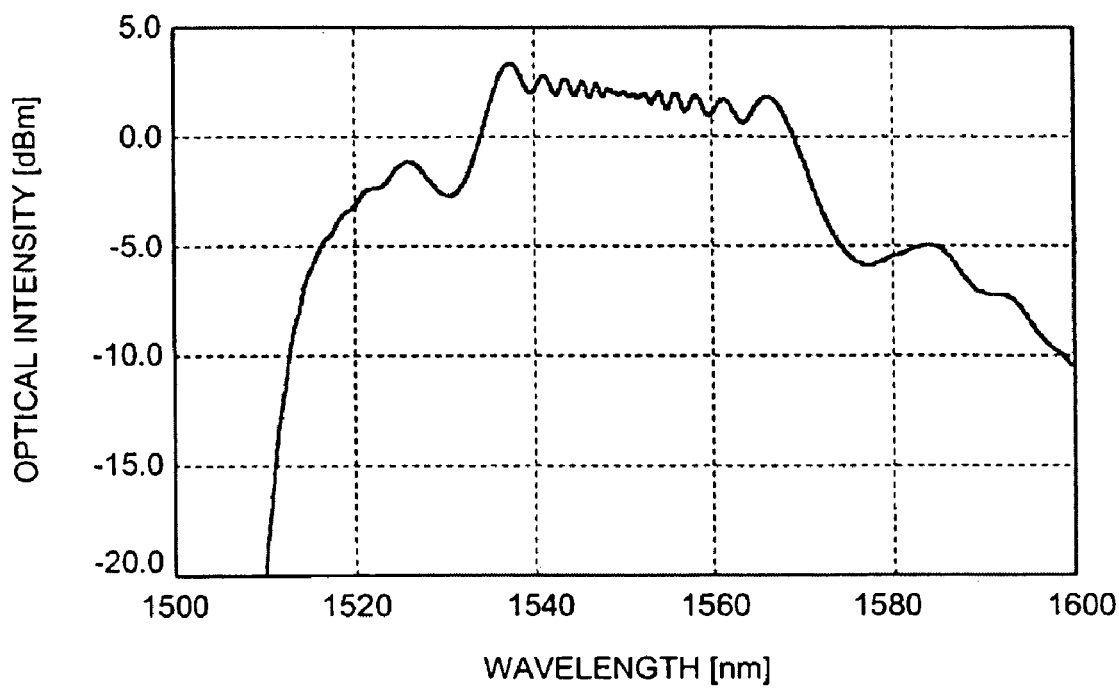
FIG. 16 is a graph of the spectrum of the SC light at the output facet of a first-stage optical fiber in the optical fiber device according to the third example.
Figure 17:
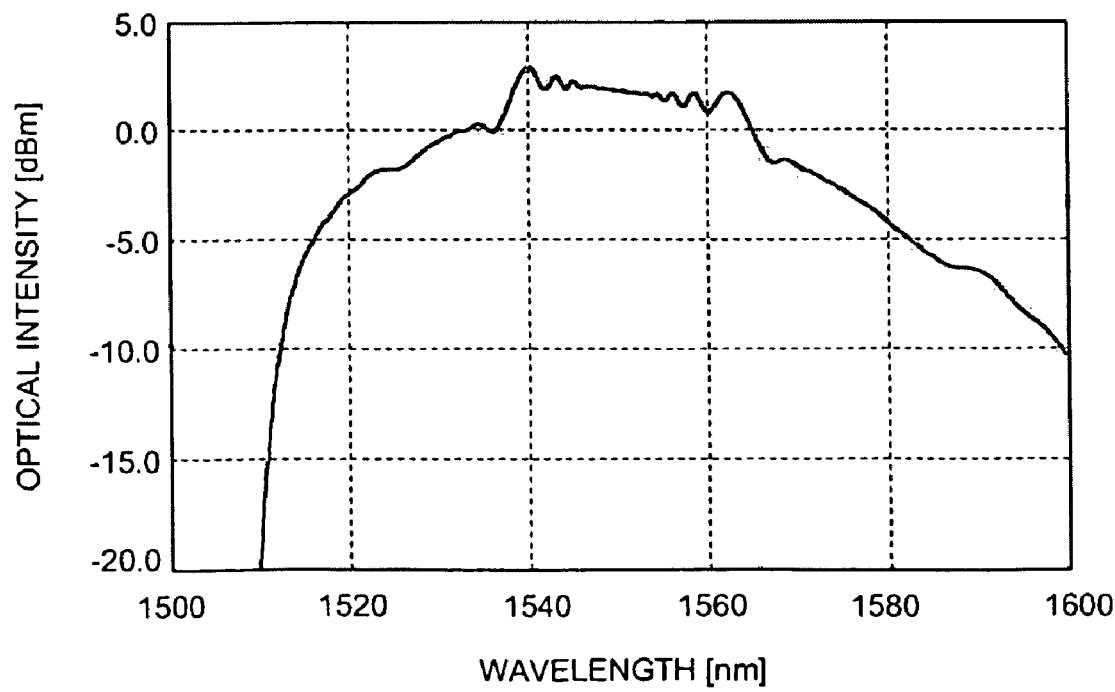
FIG. 17 is a graph of the spectrum of the SC light at the output facet of a second-stage optical fiber in the optical fiber device according to the third example.
Figure 18:
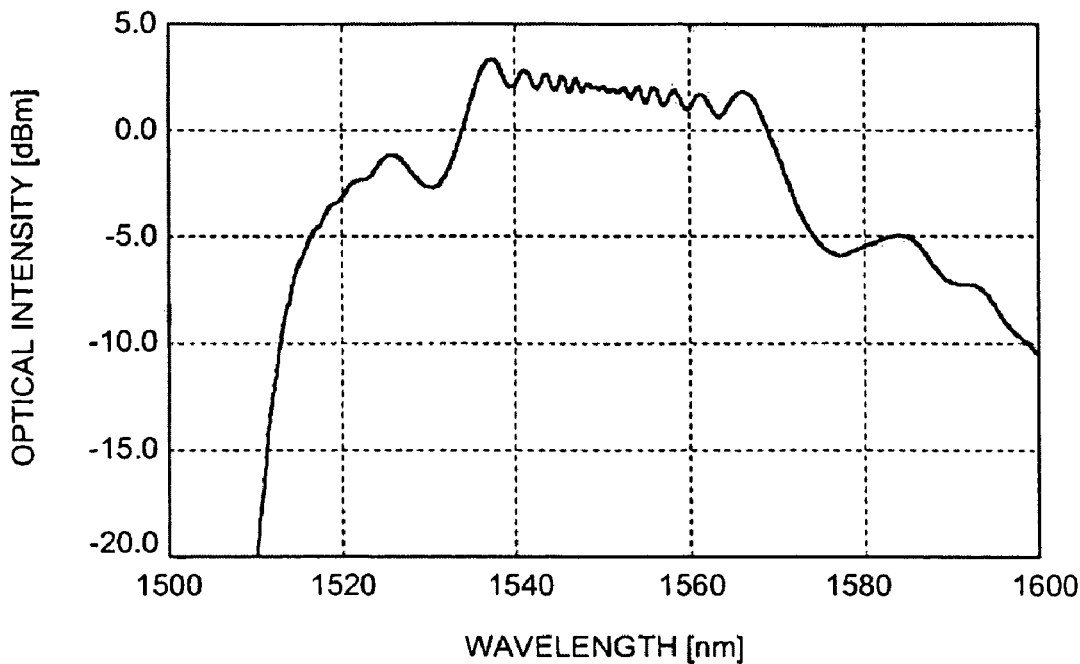
FIG. 18 is a graph of the spectrum of the SC light at the output facet of a first-stage optical fiber in the optical fiber device according to the fourth example.
Figure 19:
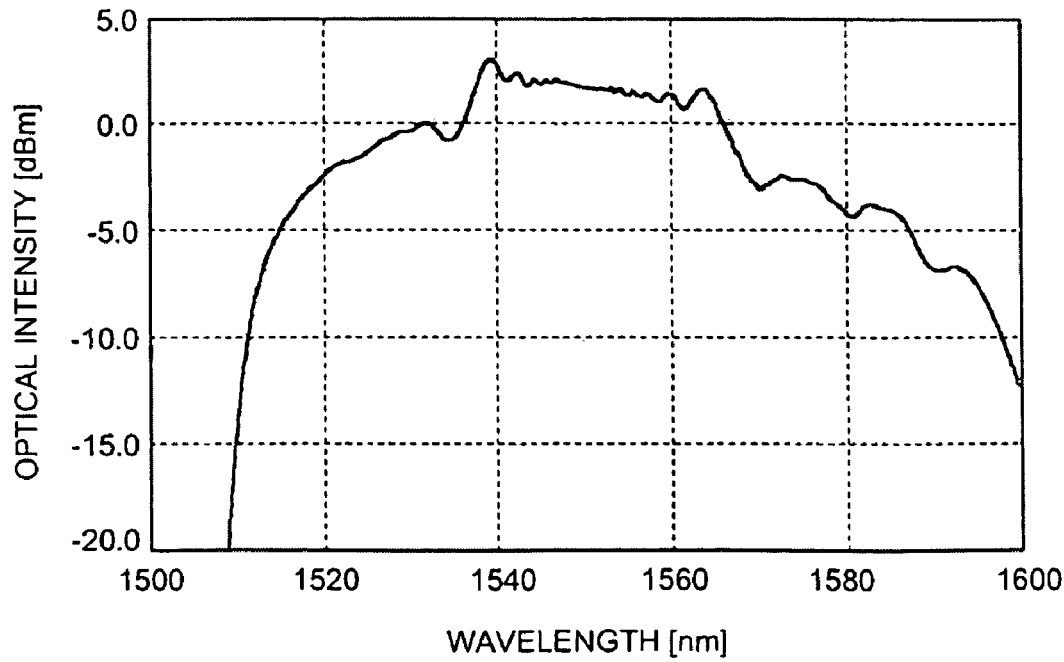
FIG. 19 is a graph of the spectrum of the SC light at the output facet of a second-stage optical fiber in the optical fiber device according to the fourth example.
Figure 20:
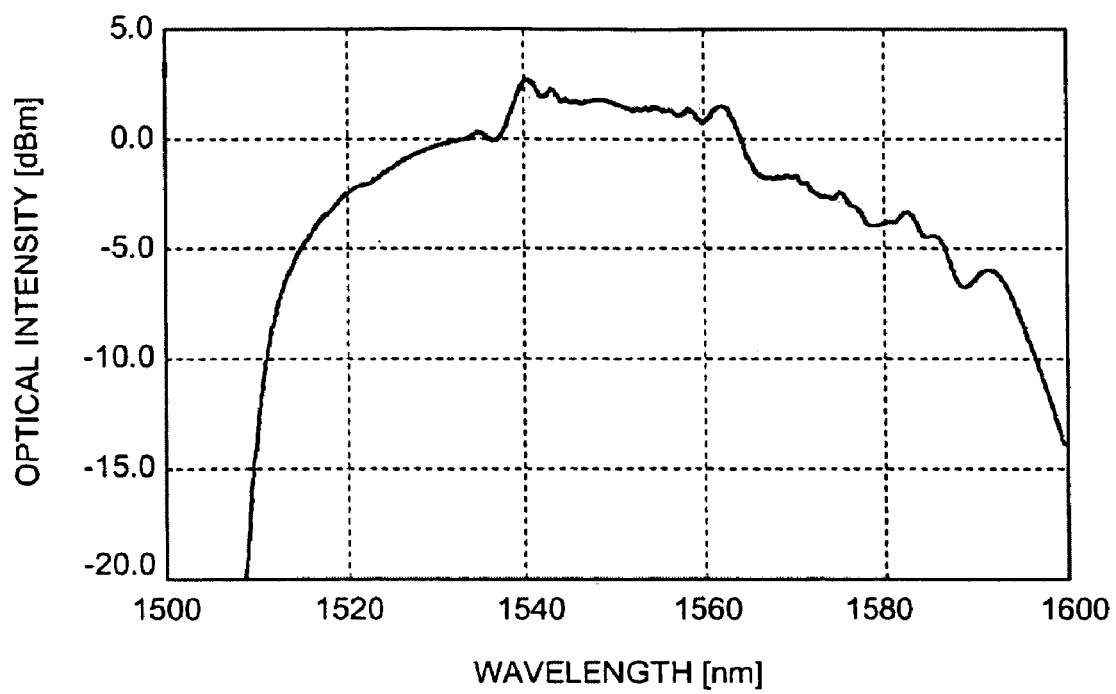
FIG. 20 is a graph of the spectrum of the SC light at the output facet of a third-stage optical fiber in the optical fiber device according to the fourth example.
Figure 21:
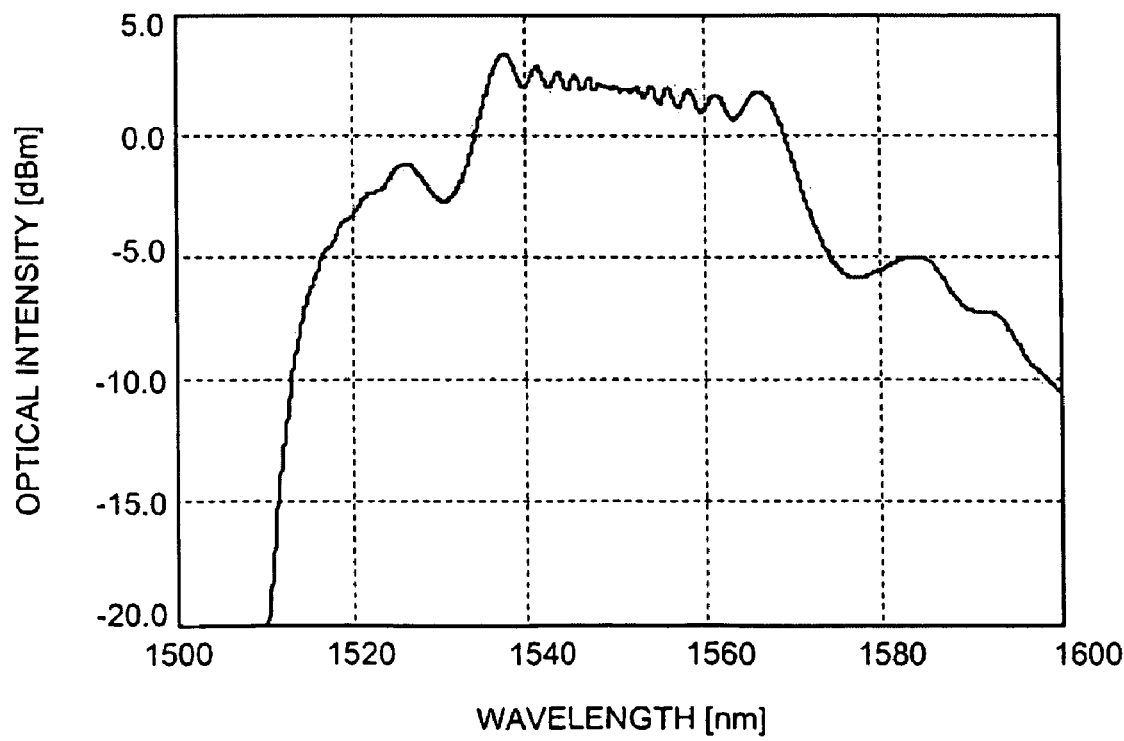
FIG. 21 is a graph of the spectrum of the SC light at the output facet of the optical fiber device according to the fourth comparative example.
Figure 22:
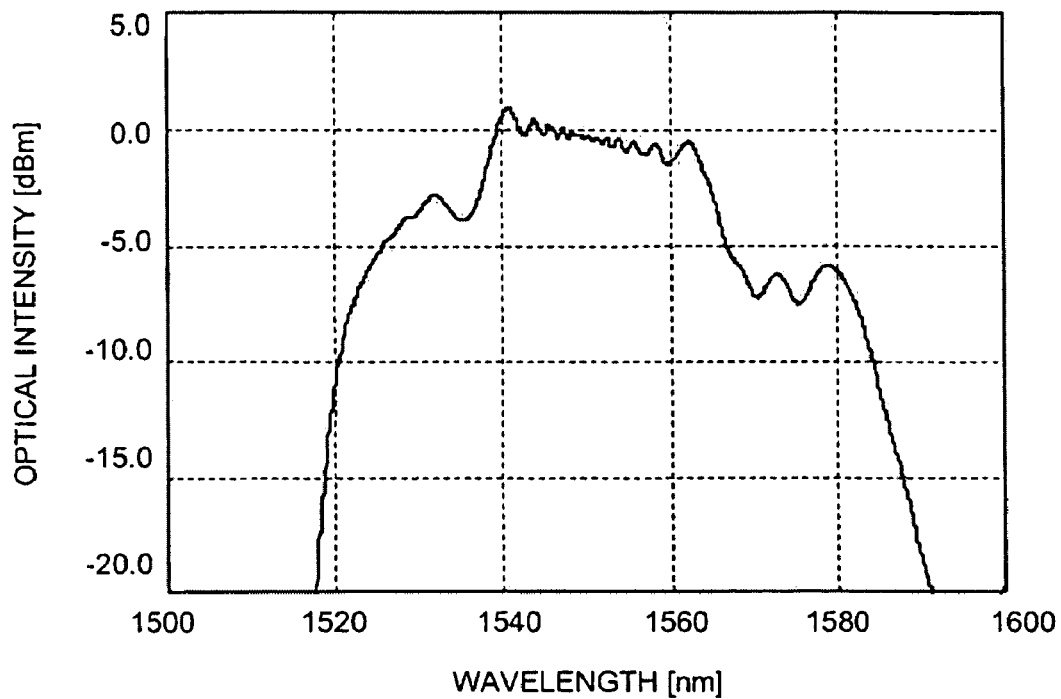
FIG. 22 is a graph of the spectrum of the SC light at the output facet of the optical fiber device according to the fifth comparative example.
Figure 23:
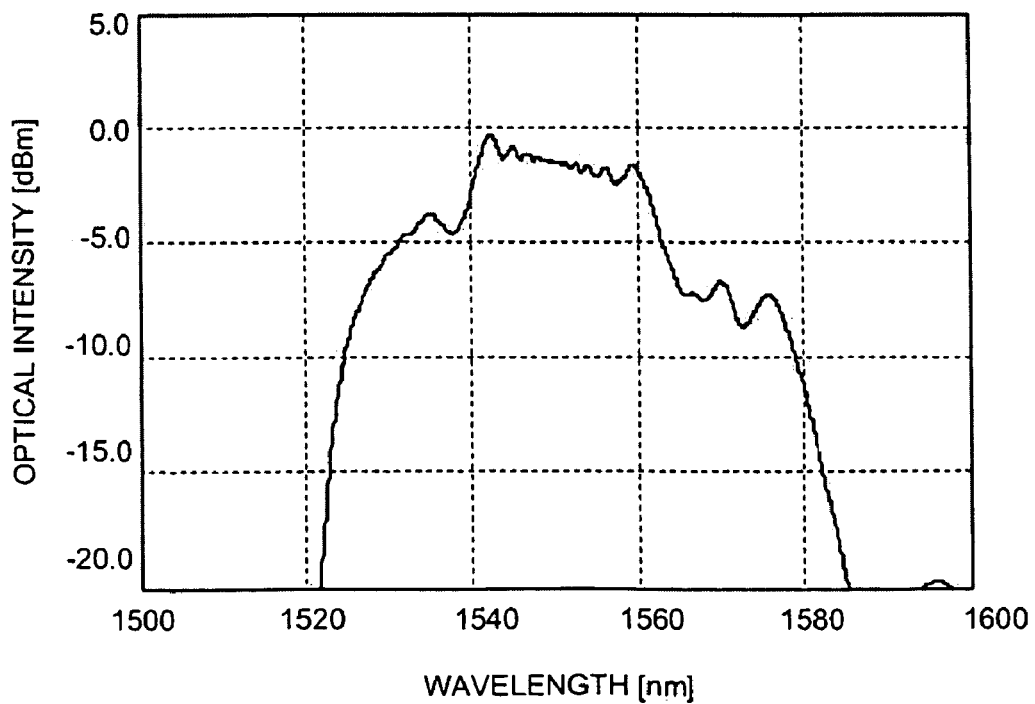
FIG. 23 is a graph of the spectrum of the SC light at the output facet of the optical fiber device according to the sixth comparative example.

FIGS. 16 and 17 are graphs of the spectra of the SC lights at the output facets of the first-stage optical fiber and the second-stage optical fiber in the optical fiber device according to the third example. FIGS. 18, 19, and 20 are graphs of the spectra of the SC lights at the output facets of the first-stage optical fiber, the second-stage optical fiber, and the third-stage optical fiber in the optical fiber device according to the fourth example. FIGS. 21, 22, and 23 are graphs of the spectra of the SC lights at the output facets of the optical fiber devices according to the fourth comparative example, the fifth comparative example, and the sixth comparative example. The wavelength dispersion of each example and each comparative example is optimized so that the bandwidth of the SC light is as broad as possible.

Figures 24, 25:
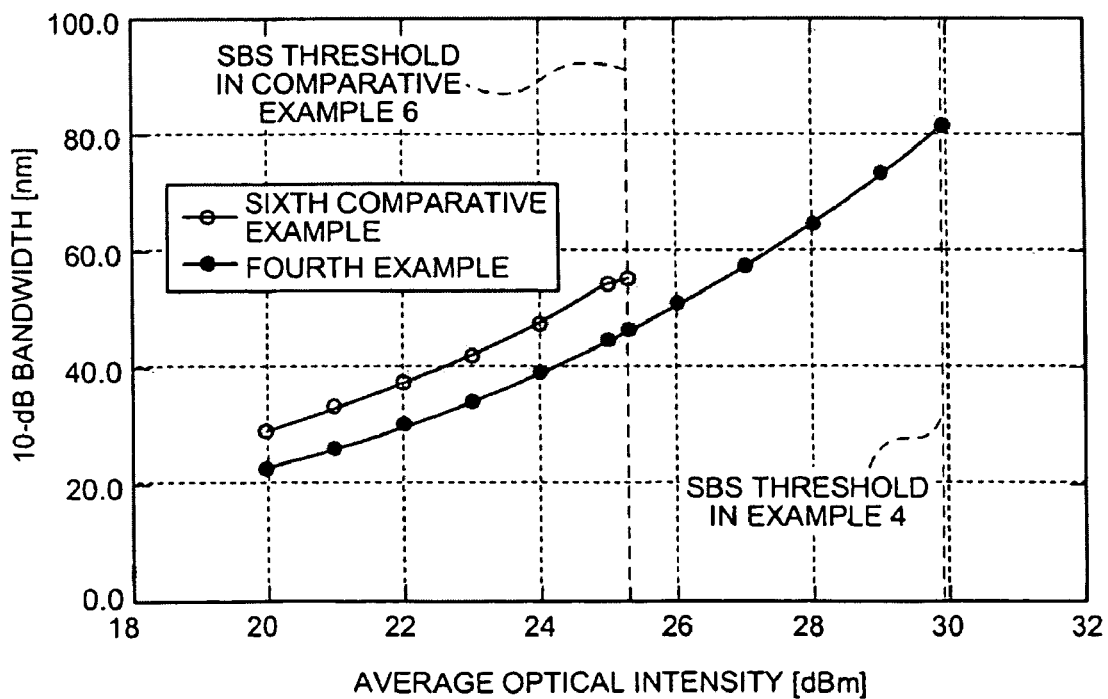
FIG. 24 is a table showing spectral bandwidth of the lights emitted from the optical fiber devices according to the third example, the fourth example, the fourth comparative example, the fifth comparative example, and the sixth comparative example of the present invention.
FIG. 25 is a graph for explaining relation between 10-dB bandwidth and average intensity of optical pulses input to the optical fibers according to the fourth example and the sixth comparative example.

FIG. 24 is a table showing the spectral bandwidth of the SC lights emitted from the optical fiber devices according to the examples and the comparative examples. Specifically, the 10-dB bandwidths measured at a 10 dB lower level from the peak of the spectrum and 3-dB bandwidths measured at a three dB lower level from the peak are shown in the table. The 10-dB bandwidth is considered to indicate a width of the entire spectrum, and the 3-dB bandwidth is considered to indicate a flat area of the spectrum. As shown in FIG. 24, the SC light emitted from each of the optical fiber devices according to the examples achieves the 10-dB bandwidth broader than that of the comparative examples while the 3-dB bandwidth being equal to or broader than that of the comparative examples. Particularly, the optical fiber device according to the fourth example generates the SC light with a broader bandwidth by reducing the absolute value of the wavelength dispersion of the third-stage optical fiber compared with that of the second-stage optical fiber, whereby compensating change of temporal shape of the optical pulses and attenuation of the peak power.

FIG. 25 is a graph for explaining relation between the 10-dB bandwidth and the average intensity of the optical pulses input to the optical fibers according to the fourth example and the sixth comparative example, which have the same whole length. With any one of the optical fiber devices, the 10-dB bandwidth broadens as the average intensity increases. The SBS threshold, i.e. an upper limit of the effective average intensity, of the optical fiber device according to the sixth comparative example is 25.3 dBm, and therefore 55.0 nm, which is the 10-dB bandwidth with the average intensity, is the upper limit of the broadness of the SC light. However, the upper limit of the average intensity with the optical fiber device according to the fourth example is 29.9 dBm and the corresponding 10-dB bandwidth is 81.5 nm. In other words, the optical fiber device according to the fourth example emits the SC light with the broader bandwidth.

As described above, the wavelength dispersions of the optical fiber devices according to the examples and the comparative examples are optimized so that the bandwidth of the SC light can be as broad as possible. An optimization procedure is explained below with reference to Comparison example 5.

Figure 26:
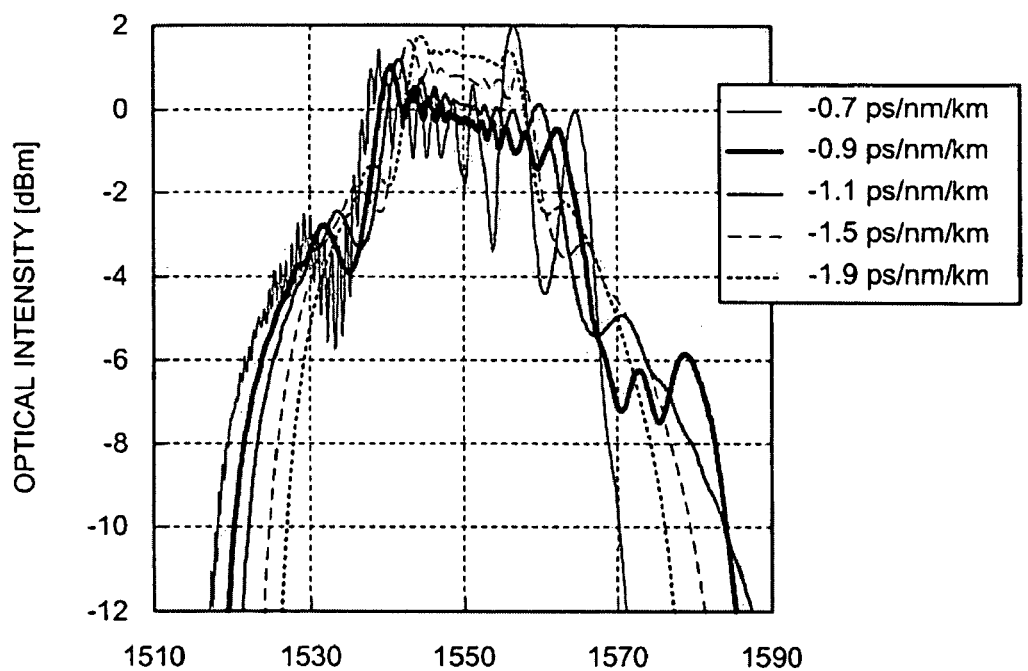
FIG. 26 is a graph of the spectrum of the SC light with varied wavelength dispersions at 1550 nm in an optical fiber having the same relative refractive index difference, the same nonlinear constant, and the same stage length as those of the optical fiber according to the fifth comparative example.
Figure 27:
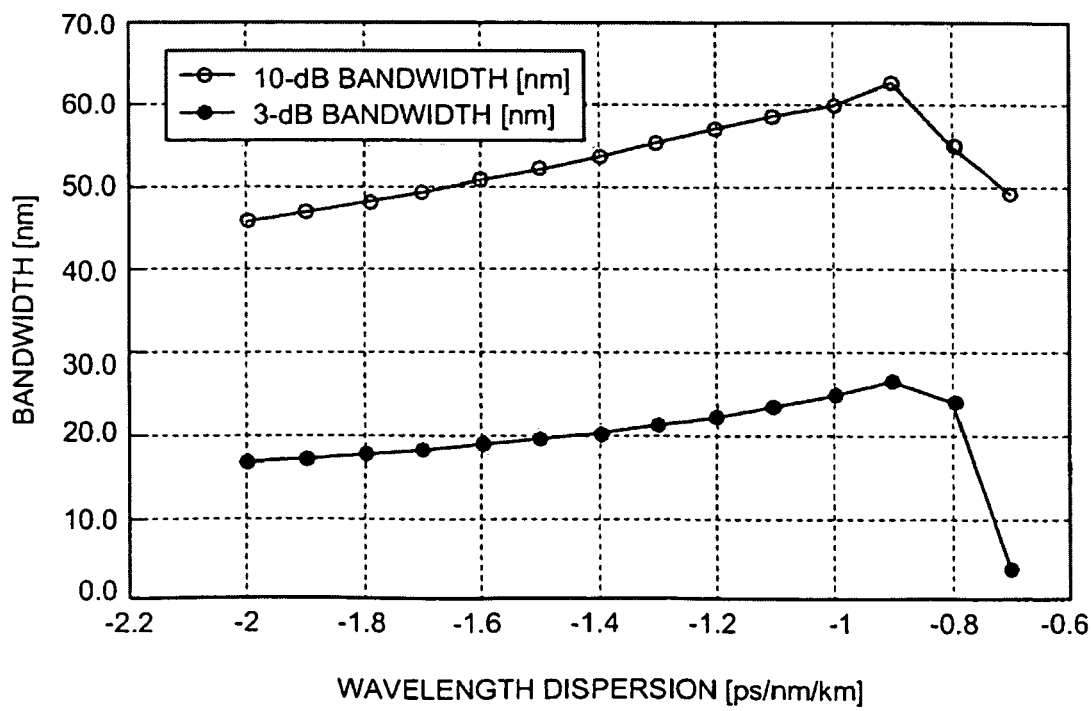
FIG. 27 is a graph for explaining relation between the wavelength dispersion at 1550 nm and 3-dB bandwidth as well as 10-dB bandwidth in the same condition as in FIG. 26.
Figure 29:
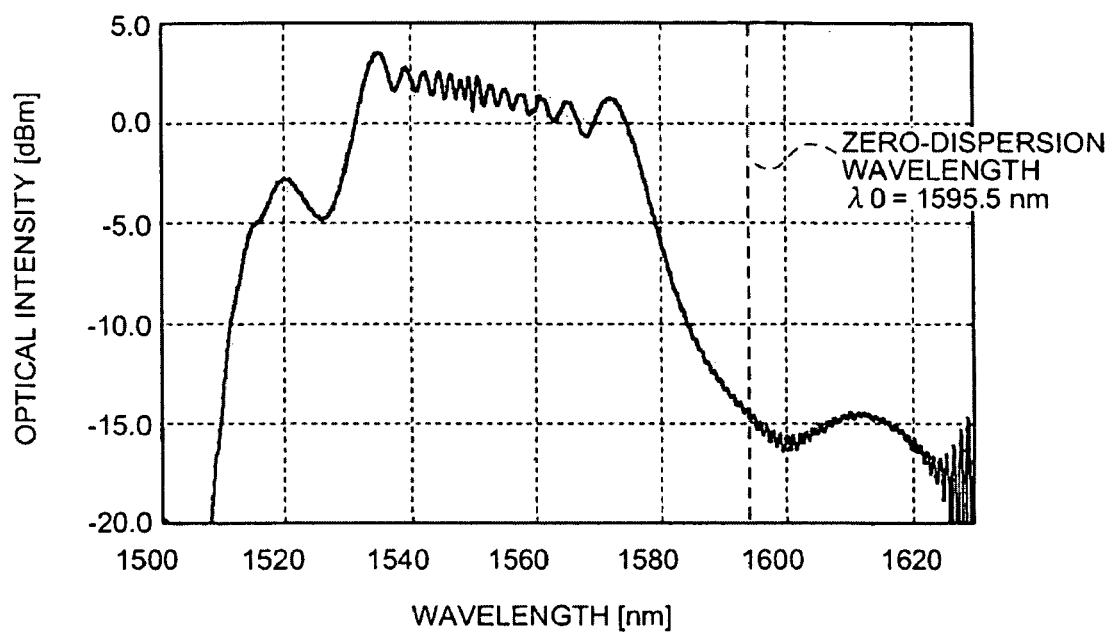
FIG. 29 is a graph of the spectrum of the SC light at the output facet of a first-stage optical fiber in the optical fiber device according to the fifth example.
Figure 30:
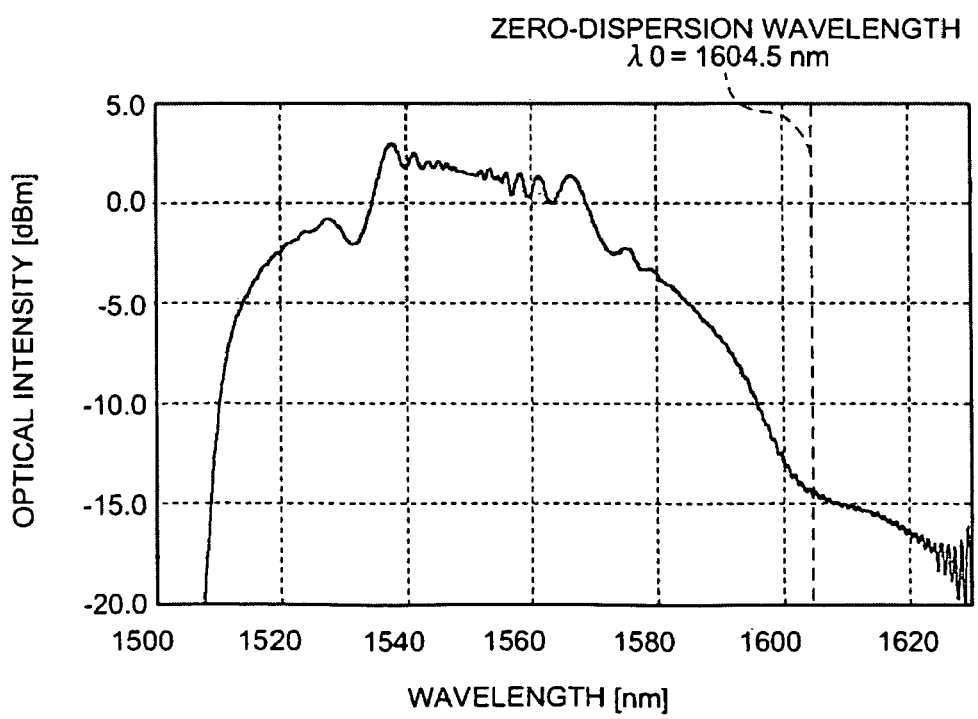
FIG. 30 is a graph of the spectrum of the SC light at the output facet of a second-stage optical fiber in the optical fiber device according to the fifth example.
Figure 31:
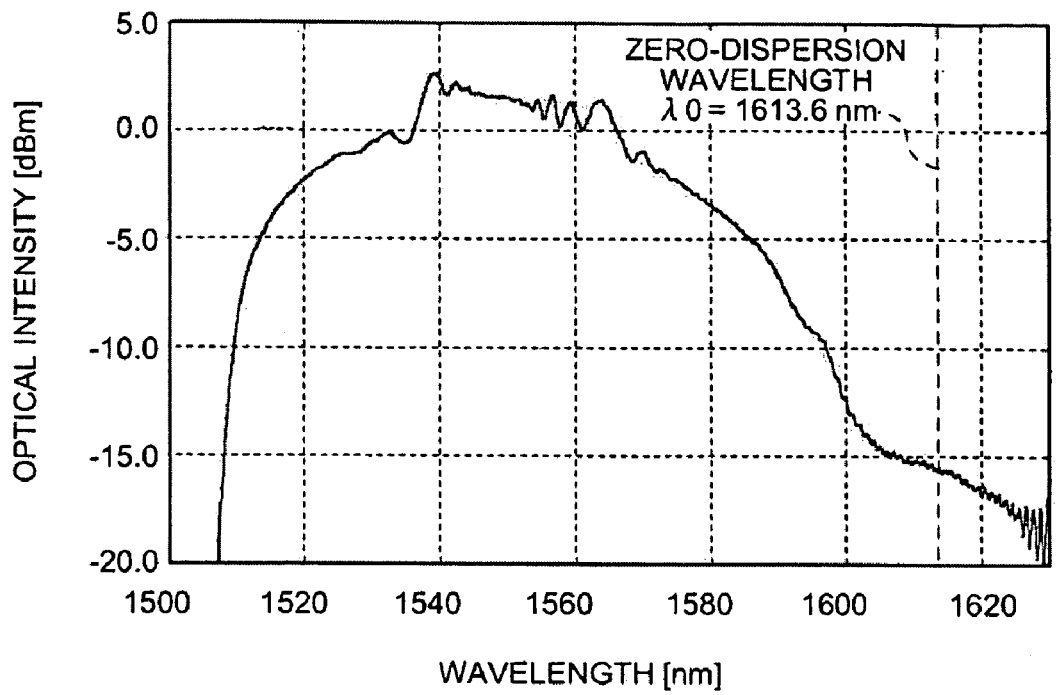
FIG. 31 is a graph of the spectrum of the SC light at the output facet of a third-stage optical fiber in the optical fiber device according to the fifth example.
Figure 32:
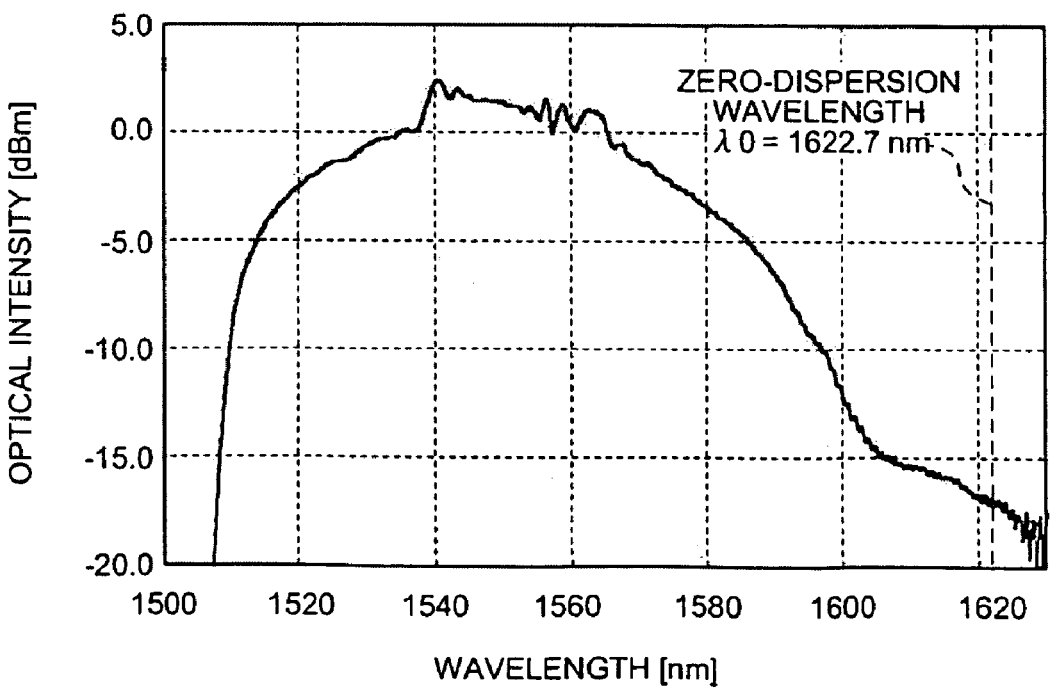
FIG. 32 is a graph of the spectrum of the SC light at the output facet of a fourth-stage optical fiber in the optical fiber device according to the fifth example.

FIG. 26 is a graph of the spectra of the SC lights with varied wavelength dispersions at 1550 nm in an optical fiber having the same relative refractive index difference, the same non-linear constant, and the same stage length as those of the optical fiber according to the fifth comparative example. The same optical pulses as shown in FIG. 15 are used. The smaller the wavelength dispersion is, the broader the spectrum is; however, if the wavelength dispersion is too small, the noises and the ripples due to the MI increase and the spectral flatness degrades. FIG. 27 is a graph for explaining relation between the wavelength dispersion at 1550 nm and the 3-dB bandwidth as well as the 10-dB bandwidth in the same condition as in FIG. 26. Because the 3-dB bandwidth and the 10-dB bandwidth are the broadest when the wavelength dispersion is −0.9 ps/nm/km, the same wavelength dispersion is used in the fifth comparative example. The wavelength dispersions in the fourth comparative example, the sixth comparative example, the third example, and the fourth example are optimized in the same procedure.

FIG. 28 is a table showing properties of optical fibers used in an optical fiber device according to a fifth example of the present invention. Each optical property except a zero-dispersion wavelength is based on the wavelength of 1550 nm. The stage length of each optical fiber is 150 m, and the total length of the optical fiber device is 600 m. The optical fiber device according to the fifth example includes four optical fibers having different relative refractive index differences connected to one another so that the relative refractive index difference decreases, that the absolute value of the wavelength dispersion increases from the input facet toward the output facet, and that the zero-dispersion wavelength increases.

As in the fourth example, the calculated properties of the SC light generated from the optical fiber device according to the fifth example are explained below assuming that Gaussian pulses at the center wavelength of 1550 nm, the pulse width of 2.0 ps, the repetition frequency of 10 GHz, and the average intensity of 29.9 dBm are input thereto.

FIGS. 29 to 32 are graphs of the spectra of the SC light at the output facet of the first-stage to fourth-stage optical fibers in the optical fiber device according to the fifth example. The spectrum of the SC light broadens as the SC light propagates through each stage of the optical fibers. The zero-dispersion wavelength of each optical fiber increases as the stage advances.

As described above, if the SC light broadens into the anomalous dispersion area, the noises due to the MI in the light increase. However, the zero-dispersion wavelength of the optical fiber device according to the fifth example is determined so that a base of the spectrum is always located in the shorter wavelength area than the zero-dispersion wavelength in each stage of the optical fibers. As a result, even when the spectrum of the SC light broadens, the SC light is always generated in the normal dispersion area, resulting in the SC light with little noises and high spectral flatness. Specifically, the SC light shown in FIG. 31 has a sufficiently broad 10-dB bandwidth of 80.86 nm and a 3-dB bandwidth of 35.87 nm with an excellent spectral flatness.

As described above, according to an aspect of the present invention, an optical fiber device generates optical pulses with a broad bandwidth and high wavelength flatness.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber device that receives a first optical pulse having a predetermined center wavelength and outputs a second optical pulse having a wavelength bandwidth broader than that of the first optical pulse, the optical fiber device comprising:

a plurality of optical fibers connected in a cascaded manner each having negative wavelength dispersion at the center wavelength, wherein the optical fibers have different relative refractive index differences from each other between a core region and a cladding region, the optical fibers are connected such that wavelength dispersions of adjacent optical fibers at the center wavelength are different from each other, and the relative refractive index differences of the optical fibers are equal to or larger than 2%.

2. The optical fiber device according to claim 1, wherein the optical fibers are connected such that an absolute value of the wavelength dispersion at the center wavelength increases from an input terminal to which the first optical pulse is input toward an output terminal from which the second optical pulse is output.

3. The optical fiber device according to claim 2, wherein the optical fibers are connected such that the relative refractive index difference decreases from an input terminal to which the first optical pulse is input toward an output terminal from which the second optical pulse is output.

4. The optical fiber device according to claim 1, wherein the optical fibers are connected such that an absolute value of the wavelength dispersion at the center wavelength increases from an input terminal to which the first optical pulse is input toward a predetermined point between the input terminal and an output terminal from which the second optical pulse is output, and then decreases from the predetermined point toward the output terminal.

5. The optical fiber device according to claim 4, wherein the optical fibers are connected such that the relative refractive index difference decreases from an input terminal to which the first optical pulse is input toward an output terminal from which the second optical pulse is output.

6. The optical fiber device according to claim 1, wherein the optical fibers are connected such that the relative refractive index difference decreases from an input terminal to which the first optical pulse is input toward an output terminal from which the second optical pulse is output.

* * * * *